Patented Nov. 2, 1926.

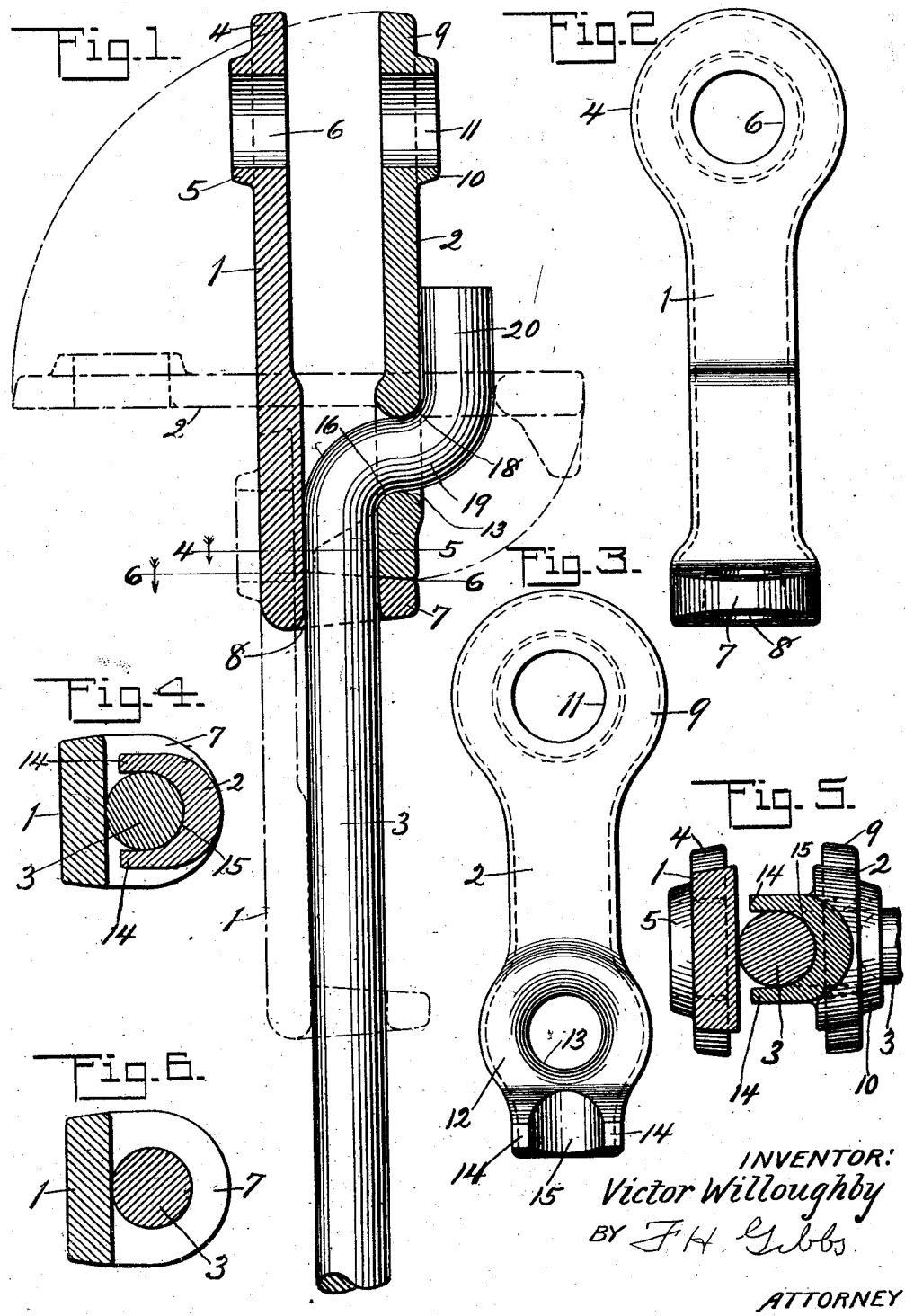

1,605,417

UNITED STATES PATENT OFFICE.

VICTOR WILLOUGHBY, OF RIDGEWOOD, NEW JERSEY, ASSIGNOR TO AMERICAN CAR AND FOUNDRY COMPANY, OF NEW YORK, N. Y., A CORPORATION OF NEW JERSEY.

BRAKE-ROD JAW.

Application filed October 23, 1923. Serial No. 670,295.

My invention is disclosed in the following full, clear and exact description, such as will enable others skilled in the art to which it appertains to make and to use the same, reference being had to the accompanying drawings which illustrate the preferred form of the invention; though it is to be understood that the invention is not limited to the exact details of construction shown and described, as it is obvious that various modifications thereof within the scope of the claims will occur to persons skilled in the art.

In said drawings:

Fig. 1 is a central longitudinal section of a brake rod jaw constructed in accordance with this invention and shown applied to a brake rod;

Figs. 2 and 3 are views in elevation of the separate members forming the brake rod jaw, shown detached from the rod;

Fig. 4 is a section taken on the line 4—5 of Fig. 1 looking in the direction of the arrow;

Fig. 5 is a section taken on the line 4—5 of Fig. 1 looking in the direction opposite to the direction of the arrow; and Fig. 6 is a section taken on the line 6—6 of Fig. 1.

It is an object of this invention to provide an improved brake rod jaw comprising separate members loosely assembled on the brake rod, the members being joined only by their connections to the brake rod and the brake lever.

As shown in the drawings, the brake rod jaw comprises the separate members 1 and 2 which are adapted to receive the brake rod 3. The member 1 consists of a forged strip having an enlarged circular end 4 provided with a central boss 5 through which is an opening 6 to receive the pin which secures the jaw to the brake lever, (not shown). At its other end the member 1 is provided with a tapered projecting lug 7 provided with an opening 8 to receive the brake rod 3. The member 2 is formed with an enlarged circular end 9 provided with a boss 10 having an opening 11 therein to receive the pin which secures the jaw to the brake lever as in the member 1. The member 2 is also formed with an enlargement 12 provided with an opening 13 having rounded edges to receive the brake rod 3 and has its other end bent to a U-shape providing tapered projections 14 on each side of the end portion 15, the taper of the projections 14 corresponding with the taper of the lug 7 with which they are adapted to engage. The rod 3 is bent at right angles as at 16 and then again bent at right angles as at 18 providing a portion 19 which extends at right angles to the length of the rod 3 and a portion 20 which is offset from the main body of the rod 3 and parallel thereto.

In assembling this device the member 1 is first placed on the rod 3 and moved along the rod to a position as shown in dotted lines in Fig. 1. The member 2 is then placed upon the rod, being held in the position shown in dotted lines in Fig. 1 and then turned to the position shown in solid lines in Fig. 1. The member 1 is then brought up so that the upper surface of the lug 7 will engage with the lower surfaces of the projections 14 of the member 2. The members are then in the positions shown in full lines in Fig. 1 with the offset portion 20 of the rod 3 in engagement with the outside of the member 2, the portion 19 of the rod 3 extending through the opening 13 and the main portion of the rod 3 engaging the end portion 15 between the projections 14 on the member 2 and extending through the opening 8 in the lug 7 of the member 1. The strains will be transmitted from the jaw to the rod 3 either directly through the engagement of the member 2 with the portion 19 of the rod or through the engagement of the lug 7 on the member 1 with the projections 14 and the member 2 and thence to the portion 19 of the rod 3. It will also be noted that the jaw is secured on the brake rod as long as it is connected to the brake lever by the pin in the openings 6 and 11 but may be readily removed from the brake rod when disconnected from the brake lever.

What is claimed is:

1. A brake rod jaw comprising a brake rod, a brake lever engaging member having a passage intermediate its length for receiving an offset portion of said brake rod and having laterally extending bracing means for engaging the brake rod, and a second brake lever engaging member for engaging the bracing means of the first member in a plane practically perpendicular to the axis of the brake rod and retaining the first member in an operative position upon a brake rod.

2. A brake rod jaw comprising a member having a tapered projection with a hole therein adapted to receive the brake rod and a second member having an opening to receive the brake rod and provided with a U-shaped rod engaging portion adapted to bear on the projection of said first member.

3. A brake rod jaw comprising a member having a tapered projection provided with a hole therein to receive the brake rod and a second member having an opening to receive the brake rod and tapered projections engaging on opposite sides of the rod adapted to bear on the projection on said first member.

4. A brake rod jaw comprising a brake rod, a member having a lateral projection provided with an opening to receive the brake rod and a second member having an opening adapted to receive an offset portion of the rod and spaced lateral projections adapted to engage a surface on the projection on said first member, said surface on the projection of the first member being inclined slightly to a plane perpendicular to the brake rod axis.

5. A brake rod jaw comprising a member forming one side of said jaw and having a projection at one end with a hole therein to receive the brake rod and a second member forming the other side of said jaw and having an opening to receive the brake rod, said second member having the end adjacent the rod opening of substantially U-shape to engage the brake rod and the projection on said first member.

6. A brake rod jaw comprising a brake rod, a member having a tapered projection with a hole therein to receive the brake rod and a second member having an opening to receive an offset portion of the brake rod and provided with a U-shaped projection extending practically perpendicularly to the axis of the brake rod and resting upon the tapered portion of the first member.

In witness whereof I have hereunto set my hand.

VICTOR WILLOUGHBY.